United States Patent
Glaser et al.

(10) Patent No.: US 11,481,805 B2
(45) Date of Patent: Oct. 25, 2022

(54) MARKETING AND COUPONING IN A RETAIL ENVIRONMENT USING COMPUTER VISION

(71) Applicant: Grabango Co., Berkeley, CA (US)

(72) Inventors: William Glaser, Berkeley, CA (US); Brian Van Osdol, Piedmont, CA (US)

(73) Assignee: Grabango Co., Berkeley, CA (US)

( * ) Notice: Subject to any disclaimer, the term of this patent is extended or adjusted under 35 U.S.C. 154(b) by 0 days.

(21) Appl. No.: 16/239,404

(22) Filed: Jan. 3, 2019

(65) Prior Publication Data

US 2019/0205933 A1   Jul. 4, 2019

Related U.S. Application Data

(60) Provisional application No. 62/613,356, filed on Jan. 3, 2018.

(51) Int. Cl.
| | |
|---|---|
| *G06Q 30/02* | (2012.01) |
| *G06T 7/20* | (2017.01) |
| *G06T 7/70* | (2017.01) |
| *G06V 20/00* | (2022.01) |

(52) U.S. Cl.
CPC ..... *G06Q 30/0255* (2013.01); *G06Q 30/0267* (2013.01); *G06Q 30/0275* (2013.01); *G06T 7/20* (2013.01); *G06T 7/70* (2017.01); *G06V 20/00* (2022.01); *G06T 2207/30196* (2013.01)

(58) Field of Classification Search
CPC ........... G06Q 30/0255; G06Q 30/0267; G06Q 30/0275
See application file for complete search history.

(56) References Cited

U.S. PATENT DOCUMENTS

| | | |
|---|---|---|
| 5,254,853 A | 10/1993 | Reich |
| 5,418,567 A | 5/1995 | Boers et al. |
| 5,502,564 A | 3/1996 | Ledger |
| 6,744,938 B1 | 6/2004 | Rantze et al. |
| 6,970,183 B1 | 11/2005 | Monroe |
| 6,996,460 B1 | 2/2006 | Krahnstoever et al. |
| 7,053,915 B1 | 5/2006 | Jung et al. |

(Continued)

FOREIGN PATENT DOCUMENTS

| | | |
|---|---|---|
| BR | 102016019151 A2 | 3/2018 |
| EP | 3454698 A1 | 3/2019 |

(Continued)

OTHER PUBLICATIONS

Elizabeth Weise: "How Amazon's line-less grocery services might really work", USATODAY, Dec. 8, 2016 (Dec. 8, 2016), Retrieved from the Internet: URL: https://eu.usatoday.com/story/tech/news/2016/12/06/amazon-go-surveillance-cameras-shopping-grocery-supermarket/95055200/ [retrieved on Feb. 21, 2020] *the whole document*.

*Primary Examiner* — Azam A Ansari
(74) *Attorney, Agent, or Firm* — Alpine Patents LLC; Brian Van Osdol

(57) ABSTRACT

A system and method for digital retail marketing and couponing in a physical retail environment that includes collecting image data across a retail environment; tracking a user within the retail environment; processing the image data and detecting a customer-item interaction event in association with the user; and based in part on the customer-item interaction event, delivering content to an output interface.

19 Claims, 10 Drawing Sheets

(56) References Cited

U.S. PATENT DOCUMENTS

| | | |
|---|---|---|
| 7,195,157 B2 * | 3/2007 | Swartz .................. G06K 17/00 235/383 |
| 7,225,414 B1 | 5/2007 | Sharma et al. |
| 7,227,976 B1 | 6/2007 | Jung et al. |
| 7,274,803 B1 | 9/2007 | Sharma et al. |
| 7,283,650 B1 | 10/2007 | Sharma et al. |
| 7,319,779 B1 | 1/2008 | Mummareddy et al. |
| 7,505,621 B1 | 3/2009 | Agrawal et al. |
| 7,590,261 B1 | 9/2009 | Mariano et al. |
| 7,711,155 B1 | 5/2010 | Sharma et al. |
| 7,734,070 B1 | 6/2010 | Sharma et al. |
| 7,848,548 B1 | 12/2010 | Moon et al. |
| 7,911,482 B1 | 3/2011 | Mariano et al. |
| 7,912,246 B1 | 3/2011 | Moon et al. |
| 7,921,036 B1 | 4/2011 | Sharma et al. |
| 7,930,204 B1 | 4/2011 | Sharma et al. |
| 7,957,565 B1 | 6/2011 | Sharma et al. |
| 7,974,869 B1 | 7/2011 | Sharma et al. |
| 7,987,111 B1 | 7/2011 | Sharma et al. |
| 3,009,863 A1 | 8/2011 | Sharma et al. |
| 8,010,402 B1 | 8/2011 | Sharma et al. |
| 8,027,521 B1 | 9/2011 | Moon et al. |
| 8,098,888 B1 | 1/2012 | Mummareddy et al. |
| 8,189,926 B2 | 5/2012 | Sharma et al. |
| 8,219,438 B1 | 7/2012 | Moon et al. |
| 8,254,633 B1 | 8/2012 | Moon et al. |
| 8,295,597 B1 | 10/2012 | Sharma et al. |
| 8,325,982 B1 | 12/2012 | Moon et al. |
| 8,351,647 B2 | 1/2013 | Sharma et al. |
| 8,379,937 B1 | 2/2013 | Moon et al. |
| 8,380,558 B1 | 2/2013 | Sharma et al. |
| 8,396,758 B2 | 3/2013 | Paradise et al. |
| 8,412,656 B1 | 4/2013 | Baboo et al. |
| 8,433,612 B1 | 4/2013 | Sharma et al. |
| 8,448,859 B2 | 5/2013 | Goncalves et al. |
| 8,452,868 B2 | 5/2013 | Shafer et al. |
| 8,520,906 B1 | 8/2013 | Moon et al. |
| 8,577,705 B1 | 11/2013 | Baboo et al. |
| 8,812,344 B1 | 8/2014 | Saurabh et al. |
| 9,120,621 B1 | 9/2015 | Curlander et al. |
| 9,141,931 B2 | 9/2015 | Ackerman |
| 9,161,084 B1 | 10/2015 | Sharma et al. |
| 9,250,712 B1 | 2/2016 | Todeschini |
| 9,262,681 B1 | 2/2016 | Mishra |
| 9,270,634 B1 | 2/2016 | Gu et al. |
| 9,317,785 B1 | 4/2016 | Moon et al. |
| 9,412,099 B1 | 8/2016 | Tyree |
| 9,426,720 B2 | 8/2016 | Cohn et al. |
| 9,474,934 B1 | 10/2016 | Krueger et al. |
| 9,600,840 B1 * | 3/2017 | Pope .................. G06Q 30/0631 |
| 9,740,977 B1 | 8/2017 | Moon et al. |
| 9,747,497 B1 | 8/2017 | Sharma et al. |
| 9,892,438 B1 | 2/2018 | Kundu et al. |
| 9,911,290 B1 | 3/2018 | Zalewski et al. |
| 9,948,902 B1 | 4/2018 | Trundle |
| 10,055,853 B1 | 8/2018 | Fisher et al. |
| 10,083,358 B1 | 9/2018 | Shin et al. |
| 10,127,438 B1 | 11/2018 | Fisher et al. |
| 10,133,933 B1 | 11/2018 | Fisher et al. |
| 10,134,004 B1 | 11/2018 | Liberate, Jr. et al. |
| 10,198,080 B1 | 2/2019 | Worley, III et al. |
| 10,198,625 B1 | 2/2019 | Shin et al. |
| 10,217,120 B1 | 2/2019 | Shin et al. |
| 10,262,331 B1 | 4/2019 | Sharma et al. |
| 10,282,621 B2 | 5/2019 | Glaser et al. |
| 10,296,936 B1 | 5/2019 | Saurabh et al. |
| 10,339,595 B2 | 7/2019 | Glaser et al. |
| 10,347,009 B1 | 7/2019 | Terven et al. |
| 10,354,262 B1 | 7/2019 | Hershey et al. |
| 10,360,571 B2 | 7/2019 | Garel et al. |
| 10,387,896 B1 | 8/2019 | Hershey et al. |
| 10,438,277 B1 * | 10/2019 | Jiang .................. G06K 9/00664 |
| 10,474,858 B2 | 11/2019 | Davis et al. |
| 10,963,893 B1 | 3/2021 | Sharma |
| 11,176,590 B2 | 11/2021 | Dechu et al. |
| 2001/0010541 A1 | 8/2001 | Fernandez et al. |
| 2002/0122559 A1 | 9/2002 | Fay et al. |
| 2003/0210340 A1 | 11/2003 | Romanowich |
| 2003/0216969 A1 | 11/2003 | Bauer et al. |
| 2004/0201754 A1 | 10/2004 | McAlister |
| 2004/0260513 A1 | 12/2004 | Fitzpatrick et al. |
| 2005/0096997 A1 | 5/2005 | Jain et al. |
| 2005/0189411 A1 | 9/2005 | Ostrowski et al. |
| 2006/0032915 A1 | 2/2006 | Schwartz |
| 2006/0147087 A1 | 7/2006 | Goncalves et al. |
| 2007/0091177 A1 | 4/2007 | West et al. |
| 2007/0146873 A1 | 6/2007 | Ortyn et al. |
| 2007/0242300 A1 | 10/2007 | Inai |
| 2007/0284440 A1 | 12/2007 | Birmingham et al. |
| 2008/0021766 A1 | 1/2008 | McElwaine et al. |
| 2008/0043013 A1 | 2/2008 | Gruttadauria et al. |
| 2008/0079142 A1 | 4/2008 | Carmona et al. |
| 2008/0208719 A1 | 8/2008 | Sharma et al. |
| 2008/0226129 A1 | 9/2008 | Kundu et al. |
| 2008/0228585 A1 | 9/2008 | Duri et al. |
| 2009/0195648 A1 | 8/2009 | Thomas et al. |
| 2010/0020173 A1 | 1/2010 | Marquart et al. |
| 2010/0255902 A1 | 10/2010 | Goldstein et al. |
| 2010/0280956 A1 | 11/2010 | Chutorash et al. |
| 2010/0295946 A1 | 11/2010 | Reed et al. |
| 2011/0072132 A1 | 3/2011 | Shafer et al. |
| 2011/0122231 A1 | 5/2011 | Fujieda et al. |
| 2011/0215147 A1 | 9/2011 | Goncalves |
| 2012/0019168 A1 | 1/2012 | Noda et al. |
| 2012/0027297 A1 | 2/2012 | Feris et al. |
| 2012/0029691 A1 | 2/2012 | Mockus et al. |
| 2012/0173351 A1 | 7/2012 | Hanson et al. |
| 2012/0173900 A1 | 7/2012 | Diab et al. |
| 2013/0073388 A1 | 3/2013 | Heath |
| 2013/0073473 A1 * | 3/2013 | Heath .................. G06Q 30/06 705/319 |
| 2013/0103537 A1 | 4/2013 | Hewett |
| 2013/0110652 A1 | 5/2013 | Herring et al. |
| 2013/0110666 A1 | 5/2013 | Aubrey |
| 2013/0147963 A1 | 6/2013 | Henninger et al. |
| 2013/0177201 A1 | 7/2013 | Fisher |
| 2013/0215116 A1 | 8/2013 | Siddique et al. |
| 2013/0223673 A1 | 8/2013 | Davis et al. |
| 2013/0284806 A1 | 10/2013 | Margalit |
| 2013/0290557 A1 | 10/2013 | Baratz |
| 2013/0317300 A1 | 11/2013 | Berci et al. |
| 2013/0335571 A1 | 12/2013 | Libal |
| 2013/0342688 A1 | 12/2013 | Siu |
| 2014/0082519 A1 | 3/2014 | Wang et al. |
| 2014/0082610 A1 | 3/2014 | Wang et al. |
| 2014/0129688 A1 | 5/2014 | Asenjo et al. |
| 2014/0245160 A1 | 8/2014 | Bauer et al. |
| 2014/0263631 A1 | 9/2014 | Muniz |
| 2014/0265880 A1 | 9/2014 | Taipale et al. |
| 2014/0272855 A1 | 9/2014 | Maser et al. |
| 2014/0279191 A1 | 9/2014 | Agarwal et al. |
| 2014/0285660 A1 | 9/2014 | Jamtgaard et al. |
| 2014/0297487 A1 | 10/2014 | Bashkin |
| 2014/0330408 A1 | 11/2014 | Rolley |
| 2014/0363059 A1 | 12/2014 | Hurewitz |
| 2014/0365334 A1 * | 12/2014 | Hurewitz .......... G06Q 30/0613 705/26.41 |
| 2014/0372957 A1 | 12/2014 | Keane et al. |
| 2015/0012396 A1 | 1/2015 | Puerini et al. |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0046213 A1 | 2/2015 | Doreswamy et al. |
| 2015/0077787 A1 | 3/2015 | Nishimura et al. |
| 2015/0077797 A1 | 3/2015 | Kurokawa |
| 2015/0088694 A1 | 3/2015 | Ackerman |
| 2015/0095189 A1 | 4/2015 | Dharssi et al. |
| 2015/0097961 A1 | 4/2015 | Ure et al. |
| 2015/0112838 A1 | 4/2015 | Li et al. |
| 2015/0124973 A1 | 5/2015 | Arteaga et al. |
| 2015/0127490 A1 | 5/2015 | Puertas |
| 2015/0133190 A1 | 5/2015 | Fisher et al. |
| 2015/0138383 A1 | 5/2015 | Kelley et al. |
| 2015/0154973 A1 | 6/2015 | Mckenna et al. |

(56) References Cited

U.S. PATENT DOCUMENTS

| | | |
|---|---|---|
| 2015/0156332 A1 | 6/2015 | Kandregula |
| 2015/0163412 A1 | 6/2015 | Holley et al. |
| 2015/0227890 A1 | 8/2015 | Bednarek et al. |
| 2015/0244992 A1 | 8/2015 | Buehler |
| 2015/0262236 A1* | 9/2015 | Cypher .............. G06F 16/955 705/14.58 |
| 2015/0310601 A1 | 10/2015 | Rodriguez et al. |
| 2015/0324725 A1 | 11/2015 | Roesbery et al. |
| 2015/0327045 A1 | 11/2015 | Chang et al. |
| 2015/0363832 A1 | 12/2015 | Bleckmann |
| 2015/0373509 A1 | 12/2015 | Wang et al. |
| 2016/0012379 A1 | 1/2016 | Iwai |
| 2016/0019514 A1 | 1/2016 | Landers et al. |
| 2016/0027262 A1 | 1/2016 | Skotty et al. |
| 2016/0037135 A1 | 2/2016 | McSheffrey et al. |
| 2016/0088211 A1 | 3/2016 | Chen |
| 2016/0100086 A1 | 4/2016 | Chien |
| 2016/0110791 A1 | 4/2016 | Herring et al. |
| 2016/0112608 A1 | 4/2016 | Elensi et al. |
| 2016/0132854 A1 | 5/2016 | Singh |
| 2016/0134930 A1 | 5/2016 | Swafford |
| 2016/0173827 A1 | 6/2016 | Dannan et al. |
| 2016/0217388 A1 | 7/2016 | Okanohara et al. |
| 2016/0224856 A1 | 8/2016 | Park et al. |
| 2016/0242252 A1 | 8/2016 | Lim et al. |
| 2016/0254864 A1 | 9/2016 | Mueller et al. |
| 2016/0270191 A1 | 9/2016 | Ludwig et al. |
| 2016/0282039 A1 | 9/2016 | Motukuri et al. |
| 2016/0289964 A1 | 10/2016 | Engberg |
| 2016/0321506 A1 | 11/2016 | Fridental et al. |
| 2016/0345414 A1 | 11/2016 | Nolan et al. |
| 2016/0358312 A1 | 12/2016 | Kolb et al. |
| 2016/0379225 A1 | 12/2016 | Rider et al. |
| 2017/0030766 A1 | 2/2017 | Hendrick |
| 2017/0032182 A1 | 2/2017 | Motukuri et al. |
| 2017/0039613 A1 | 2/2017 | Kaehler et al. |
| 2017/0053171 A1 | 2/2017 | Buehler |
| 2017/0108236 A1 | 4/2017 | Guan et al. |
| 2017/0123030 A1 | 5/2017 | Hengerer et al. |
| 2017/0124395 A1 | 5/2017 | Cohen et al. |
| 2017/0131781 A1 | 5/2017 | Buban |
| 2017/0161703 A1 | 6/2017 | Dodia |
| 2017/0169440 A1 | 6/2017 | Dey et al. |
| 2017/0178352 A1 | 6/2017 | Harmsen et al. |
| 2017/0188013 A1 | 6/2017 | Presler |
| 2017/0216667 A1 | 8/2017 | Garvey et al. |
| 2017/0228804 A1 | 8/2017 | Soni et al. |
| 2017/0249491 A1 | 8/2017 | MacIntosh et al. |
| 2017/0278175 A1 | 9/2017 | Park et al. |
| 2017/0300999 A1 | 10/2017 | Wilkinson et al. |
| 2017/0316656 A1 | 11/2017 | Chaubard et al. |
| 2017/0323376 A1 | 11/2017 | Glaser et al. |
| 2017/0332956 A1 | 11/2017 | Bigolin et al. |
| 2017/0364925 A1 | 12/2017 | Wilkinson et al. |
| 2018/0005044 A1 | 1/2018 | Olson |
| 2018/0012072 A1 | 1/2018 | Glaser et al. |
| 2018/0012080 A1 | 1/2018 | Glaser et al. |
| 2018/0088900 A1 | 3/2018 | Glaser et al. |
| 2018/0107968 A1 | 4/2018 | Wu et al. |
| 2018/0189763 A1 | 7/2018 | Olmstead et al. |
| 2018/0218562 A1 | 8/2018 | Conway |
| 2018/0232796 A1 | 8/2018 | Glaser et al. |
| 2018/0240180 A1 | 8/2018 | Glaser et al. |
| 2018/0245736 A1 | 8/2018 | Patel |
| 2018/0300553 A1 | 10/2018 | Khosla et al. |
| 2018/0322209 A1 | 11/2018 | Jin et al. |
| 2018/0332235 A1 | 11/2018 | Glaser |
| 2018/0332236 A1 | 11/2018 | Glaser et al. |
| 2018/0350144 A1 | 12/2018 | Rathod |
| 2018/0373928 A1 | 12/2018 | Glaser et al. |
| 2019/0005479 A1 | 1/2019 | Glaser et al. |
| 2019/0028643 A1 | 1/2019 | Dryoji |
| 2019/0043003 A1 | 2/2019 | Fisher et al. |
| 2019/0054347 A1 | 2/2019 | Saigh et al. |
| 2019/0079591 A1 | 3/2019 | Glaser et al. |
| 2019/0114488 A1 | 4/2019 | Glazer et al. |
| 2019/0116322 A1 | 4/2019 | Holzer et al. |
| 2019/0156273 A1 | 5/2019 | Fisher et al. |
| 2019/0156274 A1 | 5/2019 | Fisher et al. |
| 2019/0156275 A1 | 5/2019 | Fisher et al. |
| 2019/0156276 A1 | 5/2019 | Fisher et al. |
| 2019/0156277 A1 | 5/2019 | Fisher et al. |
| 2019/0156506 A1 | 5/2019 | Fisher et al. |
| 2019/0205933 A1 | 7/2019 | Glaser et al. |
| 2019/0244161 A1 | 8/2019 | Abhishek et al. |
| 2019/0282000 A1 | 9/2019 | Swafford |
| 2019/0333039 A1 | 10/2019 | Glaser et al. |
| 2020/0065748 A1* | 2/2020 | Durkee ............... G06K 7/1408 |
| 2020/0079412 A1 | 3/2020 | Ramanathan et al. |
| 2020/0134590 A1 | 4/2020 | Glaser et al. |
| 2020/0160670 A1 | 5/2020 | Zalewski et al. |

FOREIGN PATENT DOCUMENTS

| | | |
|---|---|---|
| JP | 2002232747 A | 8/2002 |
| JP | 2008054036 A | 3/2008 |
| JP | 2008079142 A | 4/2008 |
| JP | 2012008746 A | 1/2012 |
| JP | 2014149755 A | 8/2014 |
| WO | 2019032304 A1 | 2/2019 |

* cited by examiner

```
┌─────────────────────────────────────┐
│   Collecting image data across a    │
│      retail environment S410        │
└─────────────────────────────────────┘

┌─────────────────────────────────────┐
│ Tracking a user within the retail   │
│         environment S420            │
└─────────────────────────────────────┘

┌─────────────────────────────────────┐
│ Processing the image data and       │
│ detecting a customer-item           │
│ interaction event in association    │
│         with the user S430          │
└─────────────────────────────────────┘

┌─────────────────────────────────────┐
│ Based in part on the customer-item  │
│ interaction event, updating a       │
│ displayed price on a digitally      │
│  controlled price display S460      │
└─────────────────────────────────────┘
```

FIGURE 7

MARKETING AND COUPONING IN A RETAIL ENVIRONMENT USING COMPUTER VISION

CROSS-REFERENCE TO RELATED APPLICATIONS

This Application claims the benefit of U.S. Provisional Application No. 62/613,356, filed on 3 Jan. 2018, which is incorporated in its entirety by this reference.

TECHNICAL FIELD

This invention relates generally to the field of digital marketing, and more specifically to a new and useful system and method for CV-driven marketing in a retail environment.

BACKGROUND

Online stores are able to collect data during every stage of a customer's time on an online store and even across multiple stores in some cases. With such data, online stores can be more customized to individual customers. Physical stores however cannot use such techniques. Stores are designed and planned to provide a uniform environment that can be experienced by any customer entering the store. Some rudimentary techniques such as loyalty cards and coupon tools do exist, but they fail to provide deep insights such as real-time information or to report on a number of metrics that are not sense-able through such systems. Thus, there is a need in the digital marketing field to create a new and useful system and method for sensor-driven marketing in a retail environment. This invention provides such a new and useful system and method.

BRIEF DESCRIPTION OF THE FIGURES

FIGS. 6-10 are flowchart representations of variations of the method.

DESCRIPTION OF THE EMBODIMENTS

Figure 1:
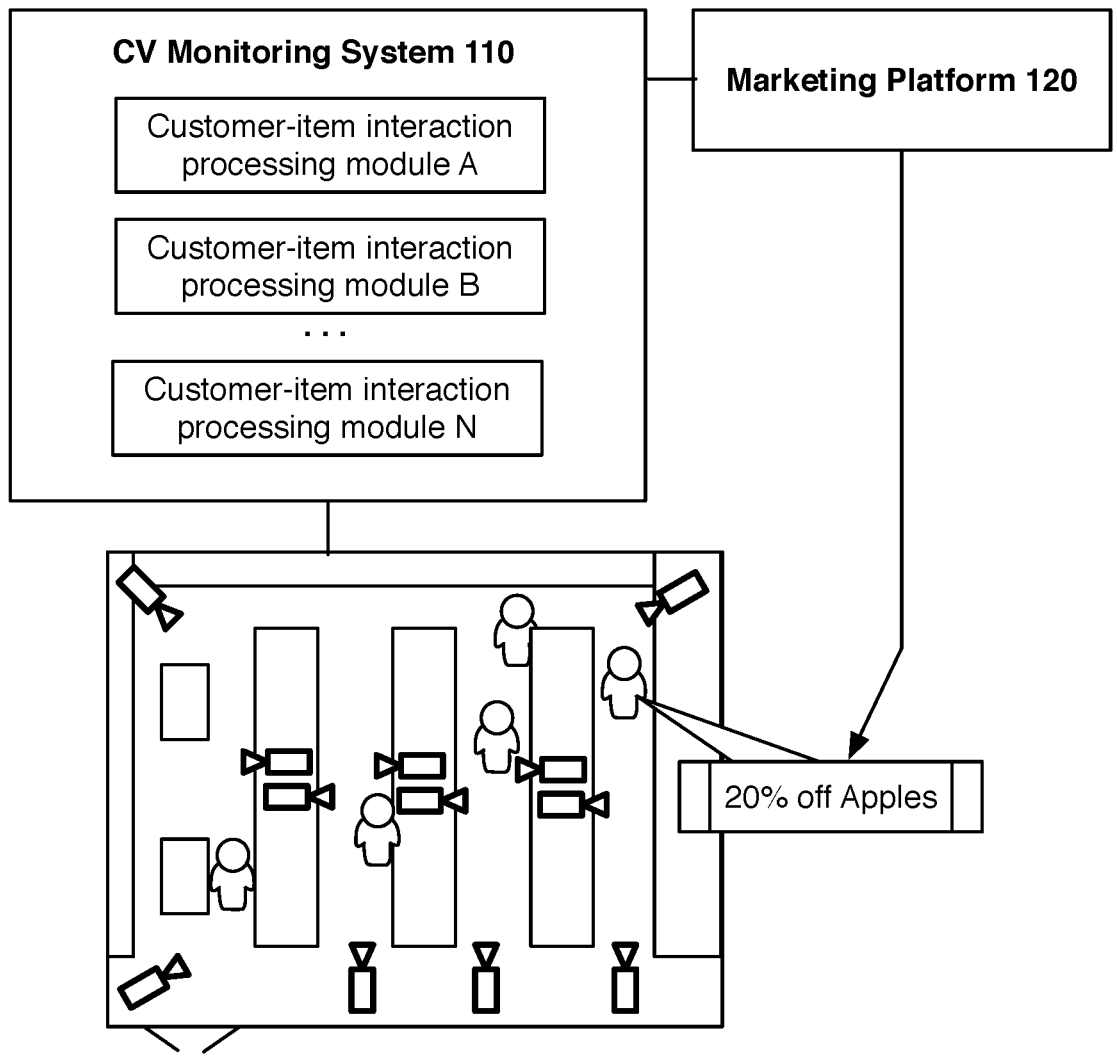
FIG. 1 is a schematic representation of a system of a preferred embodiment.

The following description of the embodiments of the invention is not intended to limit the invention to these embodiments but rather to enable a person skilled in the art to make and use this invention.

1. Overview

A system and method for providing sensor-driven marketing in a retail environment functions to apply sensor based interpretation to various marketing and product interactions. In particular, the system and method use computer vision (CV) monitoring systems such that CV-driven marketing solutions can be used in managing digital interactions within a physical environment like a store. The system and method can preferably be used to detect real-time interaction events between a user (e.g., a customer) and an item (e.g., a product and/or store marketing material). Furthermore, the system can be react to and coordinate the triggering of a digital experience in synchronization with the actions of a user.

The system and method can enable a number of new content delivery offerings that are based on unique events triggerable by the system and/or method. The system and method preferably use an environment integrated CV-driven monitoring approach to monitor customer state (e.g., location, customer identification, cart contents, product interactions, etc.) and inventory state (e.g., location, proximity to user, viewed by user, picked up by user, selected for purchase/placed in cart, returned to shelf, etc.).

The system and method can preferably be used to drive digital experiences in real-time based on item-level interactions. Item-level interactions can include physical interactions between the customer and a product but can also be non-direct interactions such as variations where the system and method deliver content based on a customer not seeing a product, moving past by the product, looking away from the product.

The system and method is preferably used within a retail space. In particular, the system and method can be used in a retail space that sales items (e.g., products). For example, exemplary retail spaces can include grocery stores, electronics stores, book stores, apparel/clothing stores, home improvement stores, appliance stores, convenience stores, and the like. Such items will generally be placed or displayed on shelves, bins, or otherwise displayed within the retail space. Retail space could also include any suitable space where a user may be browsing purchasable or selectable options such as at a furniture store, a car lot, and the like. A grocery store is used herein as a preferred example, but any suitable environment may alternatively be used.

In one exemplary implementation, the system and method can be used for operating a reactive couponing experience for customers. The reactive couponing experience is preferably a digital experience that uses sensor-based detection of item-level interactions to selectively deliver contextually appropriate coupons to a targeted customer. Coupons are used as an exemplary description of one preferred form of content, but the reactive couponing experience may be used for additional or alternative forms of digital media delivery which could include non-coupon marketing material, informational notifications, game-based notifications, multimedia content (e.g., video or audio content), and/or other forms of content. Herein, the exemplary description of the system and method applied to coupon delivery is not intended to limit the system and method to coupons, the system and method may be used for any suitable type of content delivery.

Coupons could be delivered to particular customers in substantially real-time in response to individual product interactions (or non-interactions in some cases) of the particular customer. For example, a coupon for 10% off a box of cereal could be delivered to a customer after the customer inspects the cereal but begins to move away from the cereal. By delivering a coupon near the time of consideration, the customer may be more likely to consider such an offering. The system and method may offer technical solutions for timely delivery of content like coupons, which may have significant improvement in the effectiveness of such marketing content. Furthermore, the system and method can sense and monitor the response to delivered content. By using CV-based monitoring and/or other forms of sensor-based monitoring, content delivery can be customized to the actions and responses of a customer so that content isn't delivered needlessly and potentially creating an unsatisfactory customer experience. Continuing the example above, after delivery of the coupon to the customer, the system and method can collect the data on the response of the customer to the delivered coupon which may include detecting acknowledgement of the coupon (e.g., looking at device used as medium for delivery), delayed acknowledgement (e.g., responded to coupon late or after in proximity to item), ignored coupon, positive response to coupon (e.g., viewed associated item), negative response to a coupon (e.g., moved on without further item-level interaction in that region), converted response (e.g., performed some conversion action such as selecting the item for purchase, but could also include inspecting item, or other types of verifiable interaction events), and/or other types of events.

The system and method could additionally be used for dynamic pricing, prize offerings, dynamically offering free product samples, and/or enabling other marketing techniques.

In another exemplary implementation, the system and method can use the landscape of items in physical proximity to a customer to run a content delivery auction process or bidding process. Effectively, the system and method may be used to enable a marketplace for real-time content delivery in an environment and/or across multiple environments (e.g., chains of stores). Marketers' bidding preferences (which may be represented by bidding price) along with other factors such as content/product quality and/or a customer profile may be used to dynamically select content that balances objectives such as satisfying marketer objectives and providing a quality experience for a customer. This can similarly be used to deliver the most relevant content to a customer. Marketers can preferably create content or marketing campaigns that are associated with one or more physical products. A bidding process can balance the desires of advertisers and product teams (e.g., to expose content to relevant customers) and those of the customers (e.g., to receive useful content). For example, as a customer walks down a cereal aisle, a content delivery auction can be triggered enabling products in proximity of the customer to bid for the option to deliver content. The content selected for delivery may be based on relevancy to the customer and/or context (e.g., keywords matching customer shopping history, shopping cart, and/or other factors), the content quality (e.g., size of discount, medium of content delivery, etc.), bidding price, and/or other factors. The content delivery auction process may use sensor-based monitoring of the system and method for triggering of the content delivery auction and/or for monitoring the response of the content delivery.

In another exemplary implementation, the system and method can be used for dynamically adjusting the signage in a store environment based on the customer(s) present in the environment and current context of the visible customers. This can be used to advertise promotions that are specifically relevant to one or more customers, provide product advertising to customers that may be interested in such products, or provide any suitable content.

In another exemplary implementation, the system and method can offer a flexible platform for marketers to offer unique and customized marketing strategies. In some cases, the experience of shopping at a grocery store could be gamified where purchasing different combinations of products unlocks different benefits or offerings. In another example of a gamified shopping experience, periodic in-store customer lotteries could be triggered where customers could be randomly or pseudo-randomly selected to win a prize (e.g., free purchase of all items currently in cart). Other exemplary game-experiences may alternatively be implemented. Such gamified experiences could be driven in part by the system and method offering location-based reactive content delivery in a store and/or the item-level interaction event detection. Customized marketing and product experience campaigns could be operated alongside other functionality of the system and method. Herein, the system and method are primarily described as being based on customer-item interactions as it relates to a customer interacting with a product for sale. However, customer-item interactions could additionally include customer interacting with any suitable object in the environment. In this way, gamified experiences could be built around a customer interacting with some interactive non-digital marketing material (e.g., pulling off an informational card for a product).

While the system and method are primarily described as being used to provide marketing mechanism. The system and method may additionally or alternatively be used to significantly transform the computing operation of an environmentally integrated computing system. In one alternative implementation, the system and method instead of delivering content could deliver active user feedback based on preferences or settings of a customer. For example, the system and method could be used to deliver tactile feedback (e.g., vibrate a phone or wearable) as an ambient reminder of items on a shopping list. In one usage scenario, a customer may enter a store with a digitally entered shopping list. As the customer goes through the store, they will pick up items from this list. In some cases, the customer may walk past an item without looking at the item, and a vibrational reminder could then be triggered to prompt the user to check for that item. However, the system could similarly detect when a user looked at the item on a list, possibly even picking up the item, but then ultimately decided to not purchase the item and set it back down. The system and method could distinguish between these scenarios and be used to skip tactile feedback when walking past that item since the customer acknowledged the item but decided against it.

Additionally, the system and method may be used for even more specific forms of user-store interactions enabled through the fidelity sensing capabilities of the system and method. In one variation, vibrational, visual, and/or audio feedback may be controlled in synchronization with the location of a known item on a shelf and a detected point-of-attention of a customer and a known item. The point-of-attention can characterize the location on a shelf or product display where a user's attention is modeled as being directed. A projection of an interpreted forward line-of-sight (as modeled using user pose-detection) could be used and/or projection from a detectable gesture like pointing may be used. In the example above, a customer may stop in an appropriate region of the store to purchase a specific item on their shopping list, but is having difficulty locating it. Vibrational feedback could be triggered when the user directs their gaze in the correct direction for the specific item.

The system and method may provide a variety of potential benefits. As one potential benefit, the system and method can react in real-time to interactions of a customer. Those interactions additionally include a number of possible interactions such as passing an item, looking at or in the proximity of an item, picking up an item, inspecting an item, putting an item into a cart/basket, placing an item back, comparing two items, or other suitable interactions.

As another potential benefit, the system and method is responsive to the real-time item shelving in the store. This can enable the system to be effortlessly rolled out without needing to input the current layout of a store. Similarly, such a system may be usable along with various types of checkout-free shopping systems, and could be implemented in parallel with management of various forms of automated or semi-automated checkout systems. Additionally, the system and method can work effectively even with changes to item layout. To marketers, this can mean less coordination with stores. They can create an in-store marketing campaign, launch it, and the campaign can go live based on the live status of products in a store and the customers passing by. A marketing campaign could also be effortlessly launched across multiple store locations.

As another potential benefit, the system and method can provide contextual information around a customer such as customer history, customer cart contents, customer path and previous locations in the store, customer sentiment or state, and/or other information.

2. System

Figure 2:
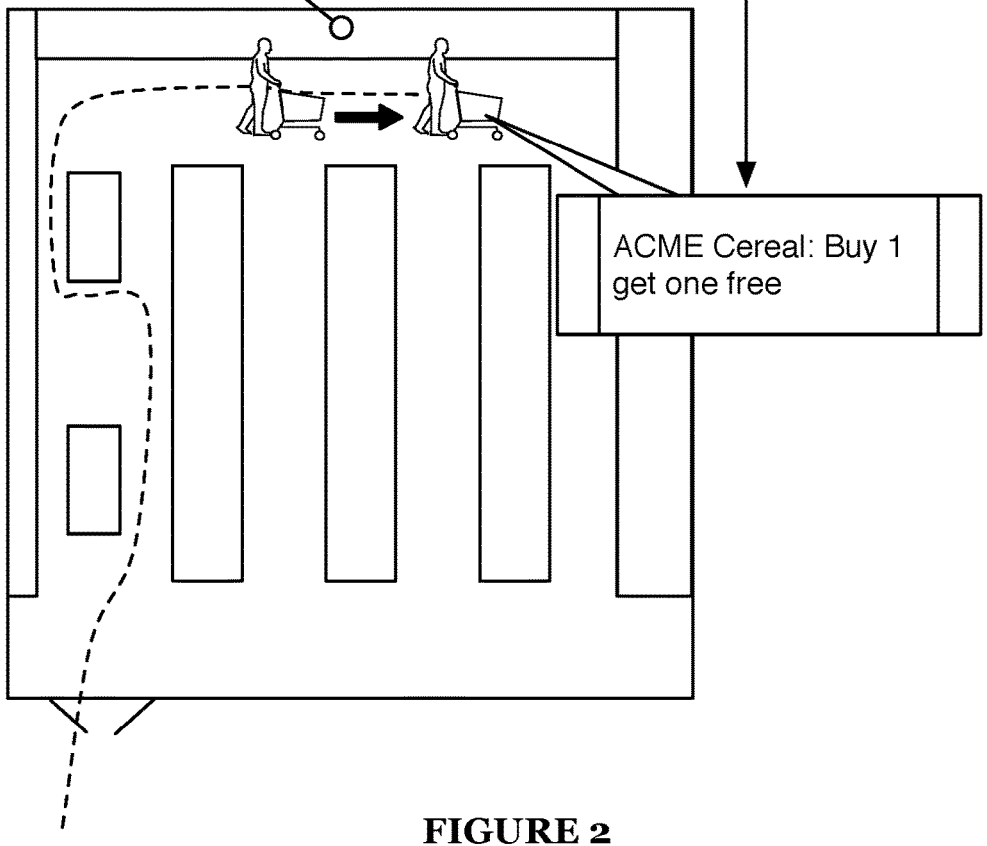
FIG. 2 is a schematic representation of an exemplary application of the system for customer-item interactions.

As shown in FIG. 1, a system for providing computer vision (CV) driven marketing in a retail environment of a preferred embodiment can include a CV monitoring system 110 configured with at least one customer-item interaction processing module and a content marketing system 120 configured to deliver content in response to the output of the customer-item interaction processing module. In a preferred implementation, the system preferably enables the configuration of customer-item interaction requests (possibly in the form of content delivery requests) that can be delivered to customers responsive to interactions of the customer and/or items in the store as shown in FIG. 2.

A CV monitoring system 110 of a preferred embodiment functions to transform image data collected within the environment into observations on customer-item interactions. The CV monitoring system 110 will preferably include various computing elements used in processing image data collected by an imaging system. In particular, the CV monitoring system 110 will preferably include an imaging system and a set of modeling processes and/or other processes to facilitate analysis of customer actions, item state, and/or other properties of the environment.

The CV monitoring system 110 preferably provides specific functionality that may be used within the system to facilitate responsive content delivery such as person identification, item identification, virtual cart generation, and/or other CV-based observations. Preferably, the CV monitoring system 110 can at least partially provide: person detection; person identification; person tracking; object detection; object classification; object tracking; gesture, event, or interaction detection; detection of a set of customer-item interactions, and/or forms of information.

The CV monitoring system 110 is at least configured with one customer-item interaction processing module. Preferably, there are multiple customer-item interaction processing modules that enable conditioning on scenarios such as customer passing an item, viewing an item, picking up an item, comparing the item to at least a second item, selecting an item for purchase (e.g., putting in cart or bag), and the like.

In one preferred embodiment, the system can use a CV monitoring system 110 and processing system such as the one described in the published U.S. Patent Application 2017/0323376 filed on May 9, 2017, which is hereby incorporated in its entirety by this reference. The CV monitoring system 110 will preferably include various computing elements used in processing image data collected by an imaging system. In particular, the CV monitoring system 110 will preferably include an imaging system and a set of exercise activity modeling processes 120 and/or other processes to facilitate analysis of activity in a gym setting.

The imaging system functions to collect image data within the environment. The imaging system preferably includes a set of image capture devices. The imaging system might collect some combination of visual, infrared, depth-based, lidar, radar, sonar, and/or other types of image data. The imaging system is preferably positioned at a range of distinct vantage points. However, in one variation, the imaging system may include only a single image capture device. In one example, a small environment may only require a single camera to monitor a shelf of purchasable items. The image data is preferably video but can alternatively be a set of periodic static images. In one implementation, the imaging system may collect image data from existing surveillance or video systems. The image capture devices may be permanently situated in fixed locations. Alternatively, some or all may be moved, panned, zoomed, or carried throughout the facility in order to acquire more varied perspective views. In one variation, a subset of imaging devices can be mobile cameras (e.g., wearable cameras or cameras of personal computing devices). For example, one implementation, the system could operate partially or entirely using personal imaging devices worn by users in the environment (e.g., workers or customers).

The imaging system preferably includes a set of static image devices mounted with an aerial view from the ceiling or overhead. The aerial view imaging devices preferably provide image data that observes at least the customers in locations where they would interact with items. Preferably, the image data includes images of the items and the customers. While the system (and method) are described herein as they would be used to deliver content to a single customer, the system and method can preferably perform such functionality in parallel across multiple customers. Therefor, the image data may collect image data that captures multiple customers and items with simultaneous overlapping customer-item interactions. The imaging system is preferably installed such that the image data covers the area of interest within the environment. In one variation, imaging devices may be specifically setup for monitoring particular product or group of products. In one exemplary implementation, the imaging system is only set up to observe particular items in a store and to provide functionality only within that region. This can act as a form of targeted marketing, and may not depend on a fully ubiquitous imaging system to be installed within a store.

Herein, ubiquitous monitoring (or more specifically ubiquitous video monitoring) characterizes pervasive sensor monitoring across regions of interest in an environment. Ubiquitous monitoring will generally have a large coverage area that is preferably substantially continuous across the monitored portion of the environment. However, discontinuities of a region may be supported. Additionally, monitoring may monitor with a substantially uniform data resolution or at least with a resolution above a set threshold. In some variations, a CV monitoring system 110 may have an imaging system with only partial coverage within the environment such as when only select portions are enabled for CV derived exercise metric tracking.

A CV-based processing engine and data pipeline preferably manages the collected image data and facilitates processing of the image data to establish various conclusions. The various CV-based processing modules are preferably used in generating customer-item interaction events, a recorded history of customer actions and behavior, and/or collecting other information within the environment. The data processing engine can reside local to the imaging system or capture devices and/or an environment. The data processing engine may alternatively operate remotely in part or whole in a cloud-based computing platform.

Customer-item interaction processing modules function to detect or classify scenarios of customer interacting with an item. Customer-item interaction processing modules may be configured to detect particular interactions through other processing modules. For example, tracking the relative position of a customer and item can be used to trigger events when a customer is in proximity to an item but then starts to move away. Specialized customer-item interaction processing modules may classify particular interactions such as detecting item grabbing or detecting item placement in a cart.

A person detection and/or tracking module functions to detect people and track them through the environment.

A person identification module can be a similar module that may be used to uniquely identify a person. This can use biometric identification. Alternatively, the person identification module may use Bluetooth beaconing, computing device signature detection, computing device location tracking, and/or other techniques to facilitate the identification of a person. Identifying a person preferably enable customer history, settings, and preferences to be associated with a person. A person identification module may additionally be used in detecting an associated user record or account. In the case where a user record or account is associated or otherwise linked with an application instance or a communication endpoint (e.g., a messaging username or a phone number), then the system could communicate with the user through a personal communication channel (e.g., within an app or through text messages).

A gesture, event, or interaction detection modules function to detect various scenarios involving a customer. One preferred type of interaction detection could be a customer attention tracking module that functions to detect and interpret customer attention. This is preferably used to detect if, and optionally where, a customer directs attention. This can be used to detect if a customer glanced in the direction of an item or even if the item was specifically viewed. A computing device interaction detection module could additionally be used to detect if and how a user interacts with a computing device like a smart phone or a wearable computing device. This could be used to detect if communicated content was read by a customer and optionally used to detect the sentiment of the customer upon accessing the content. Alternatively, the act of reading content could be detected through an application of a user computing device (e.g., receiving a read receipt), which could then be used in triggering retrieving sentiment analysis at the time and/or location of the content access.

An object detection/classification module functions to detect and apply an identifier to an object. This is preferably used in identifying products or items displayed in a store. Preferably, a product can be classified and associated with a product SKU identifier. In some cases, a product may be classified as a general type of product. For example, a carton of milk may be labeled as milk without specifically identifying the SKU of that particular carton of milk. An object tracking module could similarly be used to track items through the store.

Alternative forms of CV-based processing modules may additionally be used such as customer sentiment analysis, clothing analysis, customer grouping detection (e.g., detecting families, couples, friends or other groups of customers that are visiting the store as a group), and/or the like.

The system may include a number of subsystems that provide higher-level analysis of the image data and/or provide other environmental information. In some preferred implementations, the system may include a real-time inventory system and/or a real-time virtual cart system.

The real-time inventory system functions to detect or establish the location of inventory/products in the environment. Information on item location is preferably usable for location aware delivery of content. Item location can be used in assessing customer-item proximity and/or item-to-item proximity. For example, content may be delivered based in part on the location of a customer relative to a particular product. In another example, content may be selected from a set of content options based on content associated with items in proximity of a particular item (e.g., the item currently the subject of interaction by the user). The inventory system may additionally be used for setting planograms (or other suitable forms of an item location map), tracking inventory and operations, and/or other purposes. A preferred implementation preferably uses a real-time inventory system operated in part through the CV monitoring system 110. The CV-driven imaging variation can preferably provide automatic inventory tracking, which may be used so that the system can be deployed to a store without a slow and tedious inventory accounting process. Furthermore, the CV-driven imaging variation can adapt to changes in inventory placement in substantially real-time. Product identification, location, count, packaging, display arrangement, and/or other factors may be detected through CV monitoring system 110.

Alternatively, the inventory system can be operated through other sensing mechanisms such as RFID tracking and/or a product placement/planogram planning application (which is used to direct workers but provides substantially accurate indication of the location of products). The inventory system at least provides some information on the location of a product, and this product location can be mapped to CV-driven observations of customers.

The real-time virtual cart system functions to model the items currently selected for purchase by a customer. The virtual cart system may enable automatic self-checkout or accelerated checkout. Product transactions could even be reduced to per-item transactions (purchases or returns based on the selection or de-selection of an item for purchase). The virtual cart system may be integrated with the system to provide purchase or planned purchase information, which may be used as a condition for delivering content. The type of content delivered to customer may be based in part on their current cart contents. For example, a coupon may be selected and delivered to a customer for a particular brand of ketchup buns based in part on the customer having hamburger buns and ground beef in the cart.

The system preferably includes a customer profile system that manages characterizing a customer. In some cases, previous shopping history, responses to previously delivered content, and/or other information may be managed by the customer profile system.

The content marketing system 120 of a preferred embodiment functions to orchestrate the selection, creation, and/or delivery of content or interactions with a customer. The content marketing system 120 preferably includes a marketer portal such that marketers, store operators, and/or other entities can manage content they want to be delivered.

In one variation, the content marketing system 120 includes a content auction marketplace that serves as a bidding platform and facilitates content auctions to determine what content is delivered to a customer at a given moment. The content auction marketplace preferably addresses the scenario where multiple entities desire to deliver content to a customer during a particular store visit, while in a general location of the store, and/or while the customer is within close proximity to content associated products. The customer profile, cart contents, item proximity, bid price, content type, content quality, delivery channel, and/or other factors may be used in ranking competing bids to deliver content. In one example, the opportunity to deliver content to a customer as the customer is browsing the cereal aisle could be determined through competitive bidding of different brands. The content marketing system 120 preferably biases the bidding to account for a quality customer experience as well as delivering The content marketing system 120 may additionally include a content conversion tracking system, which can use subsequent CV-based monitoring and/or other forms of response tracking of a customer to determine the response to delivered content. Content conversions could be based on, viewing of content, viewing of associated item, selection (e.g., picking up) of an associated item, purchase of selected item, and the like. Content conversion tracking could be used in some cases to determine if a marketer is credited for content deliver. For example, a particular type of content may only be credited if the customer performs a corresponding action. The conversion rate may additionally be used in the bidding and customizing content delivery to customer preferences.

Figure 3:
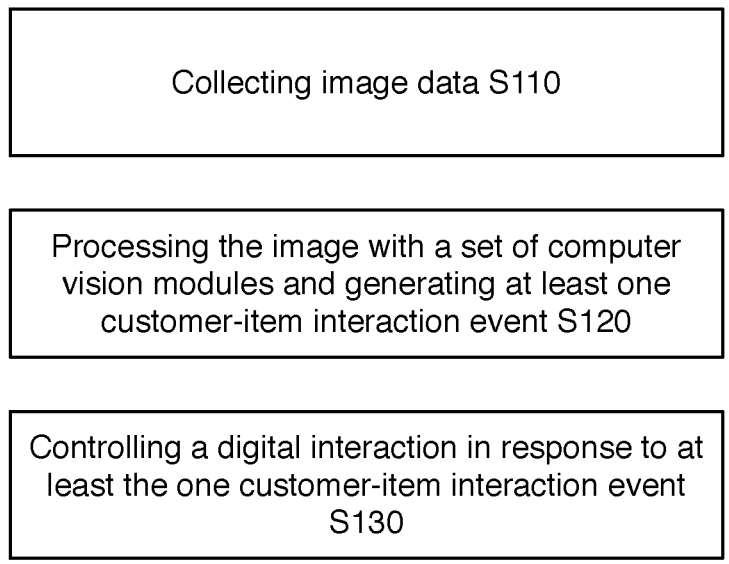
FIG. 3 is a flowchart representation of a method of a preferred embodiment.

The content marketing system 120 may integrate with a number of outlets such as user applications, communication systems, store infrastructure, and/or other outlets that can be used to facilitate the delivery of content. In the implementation, where the system is used in connection with automatic self-checkout, the application may additionally be used by a customer for managing their cart and account with the self-checkout system. Store infrastructure can include speakers (e.g., for playing audio messages), displays, (e.g., for displaying content), lighting systems (e.g., changing lighting to attract attention), and/or other store infrastructure 3. Method As shown in FIG. 3, a method for providing computer vision (CV) driven marketing in a retail environment of a preferred embodiment can include collecting image data S110, processing the image with a set of computer vision modules and generating at least one customer-item interaction event S120, and controlling a digital interaction in response to at least the one customer-item interaction event S130.

The method can be used in powering a variety of types of content delivery interactions, marketing tools, and/or human-computer interactions within a retail environment (or any suitable alternative type of environment). The method preferably provides a process through which real-time, reactive interactions can be controlled.

Figure 4:
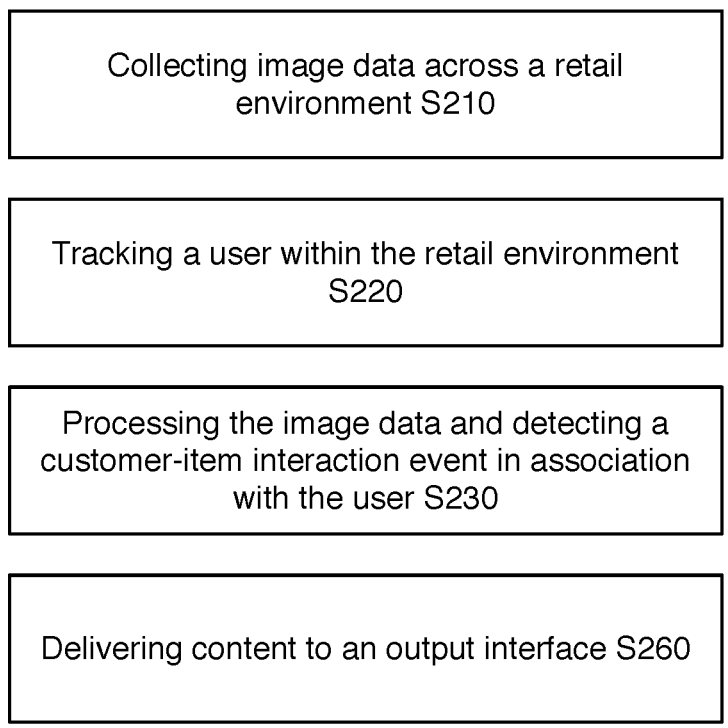
FIG. 4 is a flowchart representation of a variation of the method.

As shown in FIG. 4, one variation of the method when applied to delivering of marketing content and/or data can include collecting image data across a retail environment S210; tracking a user within the retail environment S220; processing the image data and detecting a customer-item interaction event in association with the user S230; and, based in part on the customer-item interaction event, delivering content to an output interface S260. These variations could be used in connection with a managed marketing platform where marketers could customize content, customize the targeting of content, participate in content delivery bidding, augment pricing for users, and/or perform other suitable marketing tasks.

Figure 6:
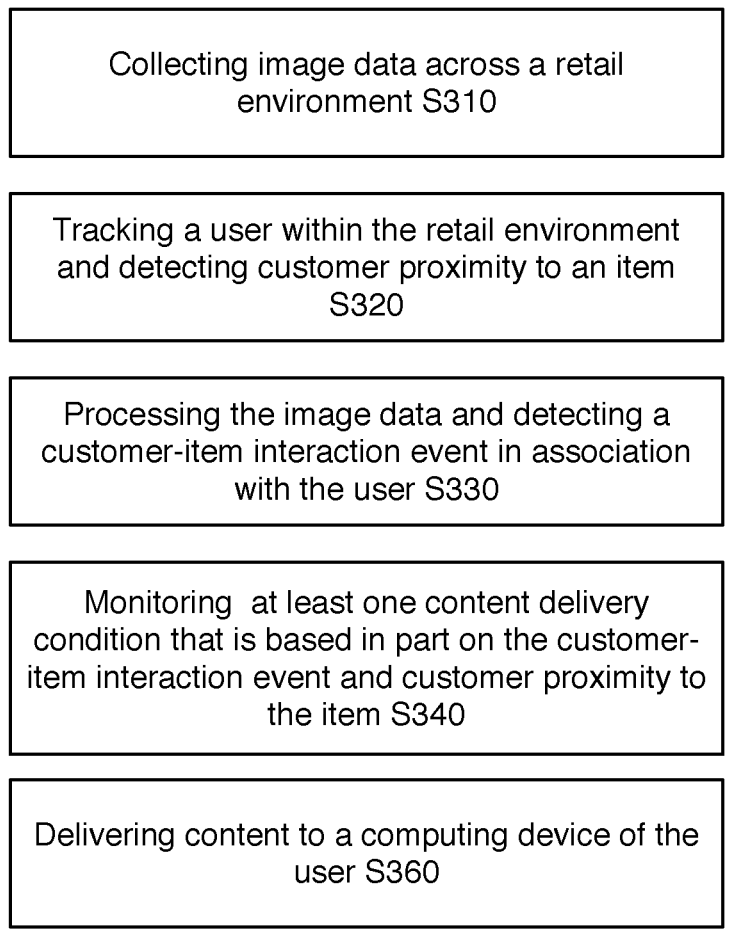

In one variation that may be applied to couponing or communication of advertisements and/or marketing materials, the method may include collecting image data across a retail environment S310; tracking a user within the retail environment and detecting customer proximity to an item S320; processing the image data and detecting a customer-item interaction event in association with the user S330; monitoring at least one content delivery condition that is based in part on the customer-item interaction event and customer proximity to the item S340; and, based in part on the content delivery condition, delivering content to a computing device of the user S360 as shown in FIG. 6. This variation may be used in contextually delivering marketing content such as coupons, advertisements, product information, and/or other forms of content. The content could be sent to an application instance operating on a computing device of the user such as a smart phone, smart watch, smart glasses, smart headphones, and the like. Herein, smart devices are preferably characterized by being network connected devices and may offer user input and/or output interfaces for device interactions.

The content could alternatively be sent to a computing device of the retail environment such as a digital price display or an in-store display. The environment-based computing device can be selected based on proximity or association with an item and/or proximity to the user. As shown in FIG. 7, an alternative variation that may be applied to item price adjustment can include collecting image data across a retail environment S410; tracking a user within the retail environment 420; processing the image data and detecting a customer-item interaction event in association with the user S430; and, based in part on the customer-item interaction event, updating a displayed price on a digitally controlled price display 460.

Figure 8:
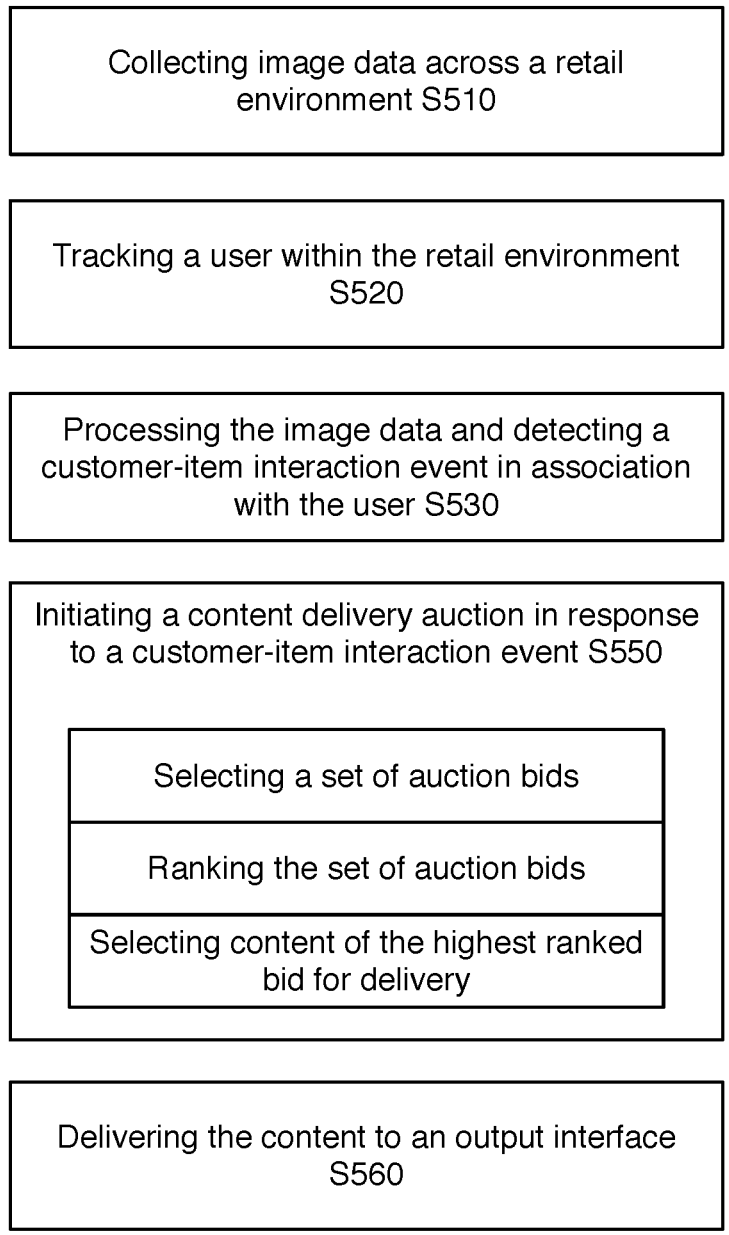

In another variation that may be applied to offering a marketplace for marketing content, the method may include collecting image data across a retail environment S510; tracking a user within the retail environment S520; processing the image data and detecting a customer-item interaction event in association with the user S530; initiating a content delivery auction in response to a customer-item interaction event S550 which includes selecting a set of auction bids, ranking the set of auction bids, and selecting content of the highest ranked bid for delivery; and delivering the content to an output interface S560 as shown in FIG. 8. This variation may function to offer a channel through which more entities can promote their products and/or content while keeping the user experience relevant and useful.

Figure 9:
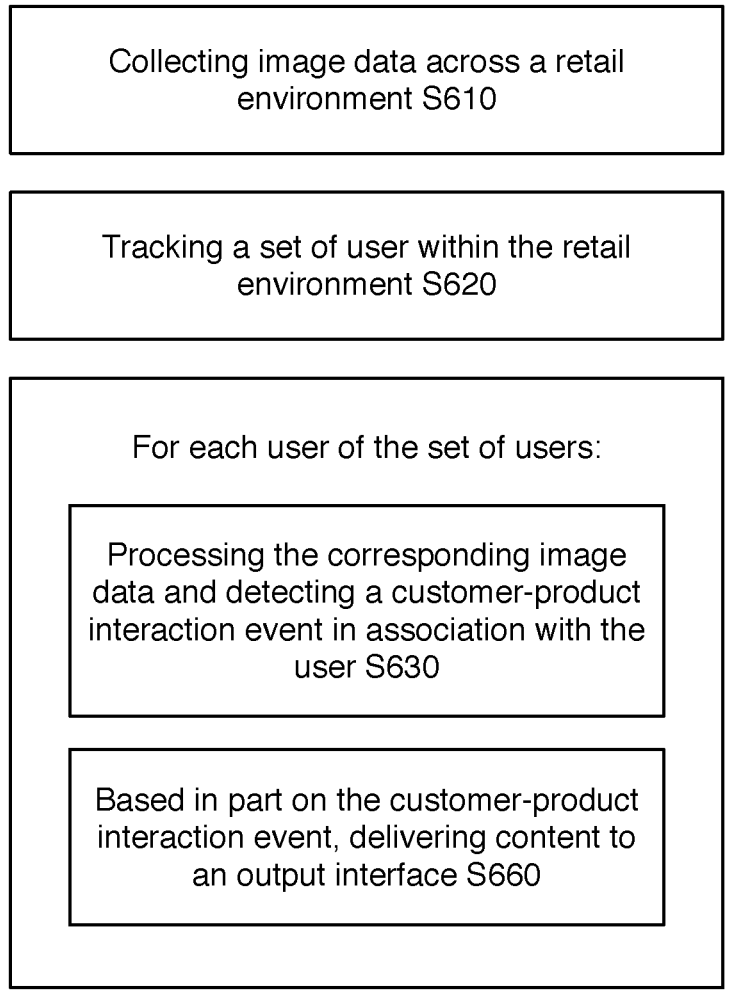

The method is primarily described as it would be implemented during one instance applied to a single user within the environment. The method is preferably implemented for parallel execution across multiple users simultaneously in a retail environment. Accordingly, the method may alternative be characterized as collecting image data across a retail environment S610; tracking a set of user within the retail environment S620; for each user of the set of users: processing the corresponding image data and detecting a customer-item interaction event in association with the user S630; and, based in part on the customer-item interaction event, delivering content to an output interface S660 as shown in FIG. 9.

The method is preferably implemented by a system such as the one described above, but any suitable system may be alternatively used. The method is primarily described as being implemented through a computer vision monitoring system but is not limited to computer vision. The method may additionally collect data through additional or alternative monitoring systems such as an RFID tag monitoring system, smart infrastructure (e.g., smart shelves with scales and/or physical or optical item selection sensors), and the like.

Collecting image data S110 and processing the image with a set of computer vision modules and generating at least one customer-item interaction event S120 are preferably substantially similar to the detailed description of blocks S210 and S230 below.

Block S130, which includes controlling a digital interaction in response to at least the one customer-item interaction event, functions to use the detected customer-item interaction to drive a particular event. The customer-item interaction event is preferably based at least in part on CV-based analysis from block S120. Additional supplemental data such as customer profile data, product data, store data, and the like can additionally be used in setting the interaction and/or in determining when to trigger a digital interaction. The properties of the customer-item interaction event, customer profile data, product data, store data, digital experience history, and other factors can be considered in an interaction condition that is evaluated to determine when and how a digital interaction is executed. While the method may include variations that use interactions driven by other conditions, the method can preferably use item-level triggering of events. Since image data will generally survey an area with multiple items, multiple item-based interactions can be driven through a single imaging device.

A digital interaction of a preferred implementation may include a customer application interaction. An alert can be triggered in a customer's application, a coupon could be delivered to a communication device of a customer, or any suitable event could be triggered. In one example, augmented reality glasses could be updated to display a promotional graphic.

In another variation, controlling a digital interaction could include controlling an environment system such as a display, an audio system, an interactive computing device, a lighting system, and/or any suitable system. This variation preferably augments systems within an environment in response to customer-item interactions. For example, a display in proximity to a customer could be updated to display a personalized coupon for that customer in response to customer-item interaction.

In another variation, controlling a digital interaction could include updating state of a software platform. This could include any suitable state update that augments a platform. In one example, various social-network features could be built around digital interactions. This could be part of a customized/alternative marketing campaign. For example, coupon and content could be customized based on digital interactions of social network connections.

The method preferably provides a customer-product interaction framework from which various interactions can be built. In one preferred implementation, this can be used for delivering marketing material, coupons, promotions, discounts, pricing, product information, and/or other product-related material to a customer based on real-time, item-specific interactions by a customer. As discussed above, one preferred variation of the method may include collecting image data across a retail environment S210; tracking a user within the retail environment S220; processing the image data and detecting a customer-item interaction event in association with the user S230; and, based in part on the customer-item interaction event, delivering content to an output interface S260, which is described in further detail below. The processes described here and their variations can similarly be used with other method variations and alternative implementations described herein.

Block S210, which includes collecting image data, functions to collect video, pictures, or other imagery of a region containing objects of interest (e.g., inventory items). Image data is preferably collected from across the environment from a set of multiple imaging devices. Preferably, collecting imaging data occurs from a variety of capture points. The set of capture points include overlapping and/or non-overlapping views of monitored regions in an environment. Alternatively, the method may utilize a single imaging device, where the imaging device has sufficient view of the exercise station(s). The imaging data preferably substantially covers a continuous region. However, the method can accommodate for holes, gaps, or uninspected regions. In particular, the method may be robust for handling areas with an absence of image-based surveillance such as bathrooms, hallways, and the like.

The imaging data may be directly collected, and may be communicated to an appropriate processing system. The imaging data may be of a single format, but the imaging data may alternatively include a set of different imaging data formats. The imaging data can include high resolution video, low resolution video, photographs from distinct points in time, imaging data from a fixed point of view, imaging data from an actuating camera, visual spectrum imaging data, infrared imaging data, 3D depth sensing imaging data, parallax, lidar, radar, sonar, passive illumination, active illumination, and/or any suitable type of imaging data.

The method may be used with a variety of imaging systems, collecting imaging data may additionally include collecting imaging data from a set of imaging devices set in at least one of a set of configurations. The imaging device configurations can include: aerial capture configuration, shelf-directed capture configuration, movable configuration, and/or other types of imaging device configurations. Imaging devices mounted over-head are preferably in an aerial capture configuration and are preferably used as a main image data source. In some variations, particular sections of the store may have one or more dedicated imaging devices directed at a particular region or product so as to deliver content specifically for interactions in that region. In some variations, imaging devices may include worn imaging devices such as a smart eyewear imaging device. This alternative movable configuration can be similarly used to extract information of the individual wearing the imaging device or other observed in the collected image data.

Block S220, which includes tracking a user within the retail environment, functions to monitor the location/position of a customer. Preferably, tracking the user includes continuously tracking the user throughout the retail environment. There may be some areas such as bathrooms, pharmacy sections, and/or other regions where location is not tracked, but movement between such untracked areas can preferably be bridged and tracked. Interruptions in tracking are preferably rectified or bridged through a tracking resolution process.

Alternatively, tracking of a user may not be continuous. In one variation, tracking of the user may include tracking the user as being present or not in discrete regions with image data. In this variation, tracking of a user may include detecting a user's presence within a region monitored for customer-item interactions. Subsequent monitoring of customer-item interactions can then be implemented for item(s) in that region.

Tracking of a user can use various techniques. Preferably, CV-based person tracking is used to track a user, at least in part. When used across an environment with multiple users, tracking of a user can include processing image data and thereby tracking location in the retail environment of a set of users. The set of users includes at least one user for which a customer-item interaction event is subsequently detected. Additionally or alternatively, other location tracking techniques may be used such as GPS racking, RF-based location triangulation, Bluetooth beaconing, and/or other suitable location tracking techniques.

In one preferred variation, tracking a user within the retail environment includes detecting customer proximity to an item, which functions to track user position relative to individual items or groups of items. Customer proximity to an item (i.e., customer-item proximity) can be used as a condition for interactions like delivering of content. Detection of customer-item proximity is preferably used in combination with monitoring a content delivery condition of block S240. In such a variation, customer-item interaction events may be conditional on the state or change of state of the customer-item proximity. Similarly, content delivery may be restricted to only be available for activation when within a set proximity threshold. For example, a user may only be eligible for receiving a coupon if the user is at least within some distance range from the item. For example, a user may only be delivered a cereal coupon if and when the customer is within ten feet of the cereal box.

Detecting proximity can additionally include detecting change in proximity, which can include detecting increasing proximity of a customer and item and/or detecting decreasing proximity of a customer and an item. In this way, digital interactions such as content delivery may be coordinated to initiate before the customer is within interactive range of the item (e.g., picking up/seeing the product) or when the customer is leaving the interactive range. The customer-item proximity can be used in any suitable manner.

Detecting customer proximity can additionally or alternatively include detecting customer attention. Customer attention can include gaze analysis for predicting the point or region of visual focus. Detecting customer attention may include detecting a defined vector of attention from computer vision modeling of the user (obtained through processing of the image data) and projecting the defined vector to an item in the environment. This can be used to identify an item on a shelf or otherwise stored and displayed for a customer-item interaction event. Computer vision modeling in one variation can include performing pose estimation of the user through processing of the image data. This can be used in modeling the direction of the head, eyes, body, or any suitable type of heuristic for direction of attention. Customer attention could alternatively be a generalized representation of attention such as a two dimensional direction of attention based on the properties such as the direction of the front of the body.

Block S230, which includes processing the image data and detecting a customer-item interaction event in association with the user, functions to apply image data analysis to detect some condition relating to one or more customers and preferably one or more items in the store. The processing is preferably used to detect one or more events that can be used as a trigger for delivery or as a factor in determining the delivery of some content (e.g., selecting the content). The processing preferably utilizes one or more CV-based processes. More preferably, multiple forms of CV-based processing techniques are applied to detect multiple elements that are used in combination to detect a customer-item interaction. For example, processing the image can include various CV-based techniques such as application of neural network or other machine learning techniques for: person detection; person identification; person tracking; object detection; articulated body/biomechanical pose estimation; object classification; object tracking; extraction of information from device interface sources; gesture, event, or interaction detection; scene description; detection of a set of customer-item interactions (e.g., item grasping, lifting, inspecting, etc.), and the like.

Preferably detecting a customer-item interaction event includes detecting one or more types of interactions between the user and a product.

In one variation, detecting a customer-item interaction event includes detecting customer attention directed at an item. Direct user attention may be detected as the user specifically directing attention on a particular item. Direct user attention may have a minimum amount of time before satisfying an initial condition of a content delivery condition. For example, a user must look in the direction of a product for at least two seconds. Alternative implementations may use the time of direct user attention as an input into a content delivery condition AI model. Approximate user attention may be detected for when a user directs attention in the direction of an item. This may occur if a user is inspecting a number of different products on a shelf.

In another variation, detecting a customer-item interaction event includes detecting an item pickup event, which functions to detect when a user handles an item. Detecting an item pickup even preferably includes detecting an image/video event of a user grasping an item and optionally moving the item from storage.

In another variation, detecting a customer-item interaction event includes detecting item selection which functions to detect when a user selects a user for an intended purpose (e.g., for checkout/purchase). This can include detecting placement of an item in a cart or bag or alternatively carried or taken by the user.

In another variation, detecting a customer-item interaction event includes detecting an item put-back event, which functions to detect when a user returns an item to item storage. This may include detecting the item returned to the same or different location from when it was originally stored. A put-back event may occur when a user selects an item or picks up an item but changes their mind.

More detailed contextual events could additionally or alternatively be detected such as detecting product comparison, detecting nutrition or product information inspection, detecting price inspection, detecting diverted attention away from an item, detecting looks at a related item (e.g., neighboring item(s)), and/or detecting other suitable forms of interactions between a customer and an item.

Detecting a customer-item interaction event may additionally be triggered on the omission or lack of a detected event. The non-occurrence of one of the customer-item interaction events above may be conditional on one or more types of customer-item interaction events happening before or after the non-occurrence and/or on the customer-item proximity.

In one preferred implementation, processing the image data and detecting at least one customer-item interaction event can include detecting the occurrence or non-occurrence of a customer-item interaction event selected from the set of customer interaction events that includes detecting customer attention directed at an item, detecting an item pickup event, detecting item selection, detecting an item put-back event, and/or any suitable process for detecting an interaction event.

Other CV-based techniques could additionally be used in other forms of image data analysis, and may include customer sentiment analysis, clothing analysis, customer grouping detection (e.g., detecting families, couples, friends or other groups of customers that are visiting the store as a group), and/or the like. Detecting user sentiment during one of the customer-item interaction events can be a supplementary input that may be used in various heuristics or models in determining state of a content delivery condition. In some variations, human-in-the-loop processing may assist in part or whole for the analysis. CV-based techniques can be used within image data collected from a single camera but may additionally be applied across image data from multiple cameras.

In an exemplary store-based implementation, customers are tracked through the environment; items on shelves are classified/identified and associated with purchasable products; and items selected for purchase by a customer (e.g., items in a cart, bag, or otherwise picked up by the customer) are tracked as part of maintaining a virtual cart of the customer. Customer tracking and item location detection are preferably used. Customer location may alternatively be based on detection in the field of view of one camera that is part of a distributed network of cameras. Item location can be automatically detected, but could alternatively be programmed or specified through another mechanism. In an example of CV-based item location detection, the identity of the items can be detected and mapped to their location on the product storage objects (e.g., shelves). In an example of pre-configuration, a planogram could be entered and synchronized to the CV analysis of an environment. CV-based processing can additionally be used to associate an application instance and/or a customer account with that of a CV modeled customer. This association may be used for setting a destination or channel for digital interactions of block S130 or content delivery in block S260.

Figure 10:
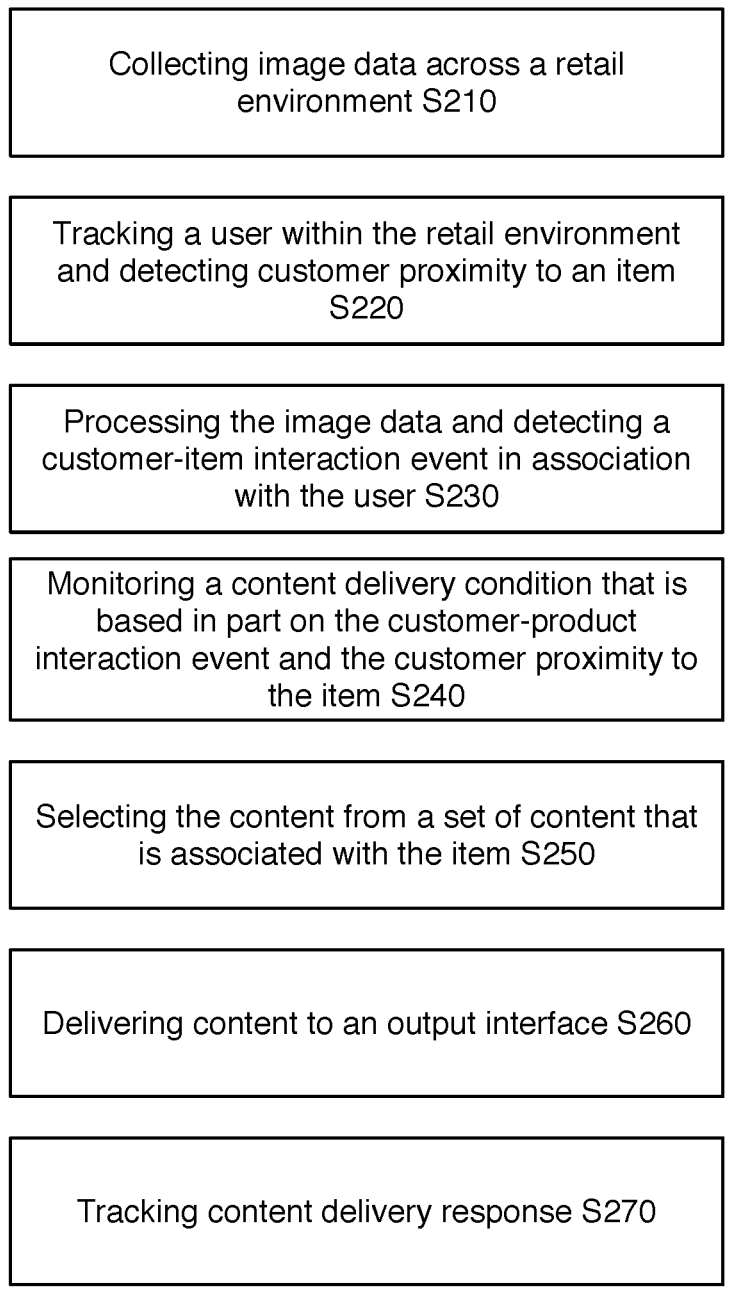

Additionally some variations such as that shown in FIG. 10 may include monitoring a content delivery condition that is based in part on the customer-item interaction event and the customer proximity to the item S240, which functions to evaluate when to initiate or trigger an interaction like content delivery. Block S240 is preferably implemented in combination with detecting customer proximity to an item. Additionally, the delivery of content to an output interface is preferably delivered upon satisfying a content delivery condition. Herein, satisfying the content delivery condition may be any suitable type of output from a set of heuristic rules, Boolean logic, machine learning model, and/or other form of analysis that can indicate when content should be delivered.

A content delivery condition preferably assesses when the conditions are right for delivery of content based on a set of different inputs. Inputs to the content delivery condition can include user proximity to an item, one or more positive customer-item interaction events, non-occurrence of one or more customer-item interaction events, the sequence of customer-item interaction events, user properties (e.g., current shopping trip information, long-term shopping history, etc.), current cart contents, and/or other inputs.

The content delivery condition may additionally include settings that specify the manner in which content should be delivered which may include properties such as timing of delivery (e.g., immediately, delayed, timed with a future event, etc.), the medium of delivery, the selection of the content, and/or any other properties or options for content delivery.

The content delivery condition can be based on interactions like when a customer looks at an item, looks away from an item, looks at a related item (e.g., neighboring item(s)), picks up an item, replaces an item (e.g., sets down an item), inspects an item (e.g., looks at detectable regions of packaging like nutritional facts, ingredients, description, price, etc.), compares items (e.g., picks up or looks at two or more items within a shared product category), places an item in a cart, removes an item from a cart, and/or the like.

In one variation, the content delivery condition can be based on when a customer enters a proximity threshold or leaves a proximity threshold.

In one preferred variation, monitoring a content delivery condition includes detecting an occurrence of a customer-item interaction event selected from detection of user attention event, item pickup event, item selection event, and item put-back event. Any suitable set of customer-item interaction events as described herein may alternatively be used. The events are preferably item-level interactions that directed or performed in association with a particular item or type of item. In some variations, these events may be generalized to detecting the interaction events for a group of items, which are preferably related items stored adjacently or in close proximity. Additionally or alternatively, monitoring a content delivery condition can include detecting an omission of a customer-item interaction event performed by the user when within a defined proximity to an item. This can function to trigger on the situation when a user does not perform one particular interaction event.

The content delivery condition could be based on one or more interactions (positive or negative occurrences). Accordingly, detecting occurrence and/or omission of a customer-item interaction event may include detecting a sequence of customer-item interaction events.

The content delivery condition could additionally be based on interactions detected across different sets of items and/or customers. In some variations, content may be delivered in S260 when a customer satisfies a set of different content delivery conditions for two or more products. For example, a coupon for hamburger buns may be conditionally delivered based on item selection of two or more selected from hamburger meat, lettuce, tomatoes, and cheese, and current proximity approaching the location of the hamburger buns. Content may be related to the item in close proximity but could alternatively be content relating to any suitable product. For example, a hamburger bun coupon may be delivered when a customer adds a package of ground meat to their cart.

Within a retail environment, multiple content campaigns can be active at the same time across multiple products. Multiple different content delivery conditions therefore can be configured and monitored across multiple customers.

In some variations, content delivery conditions could be set to be uniform across all items. More preferably, content delivery conditions may be dynamically customized to properties of a scenario. This can include targeting content delivery based on a customer profile, item profile, store profile, and the like. Accordingly, the method can include collecting supplemental data such as collecting customer shopping history, customer preferences, item purchase history (e.g., type of customers that have purchased an item), and the like.

The method preferably includes moderating delivery of multiple pieces of content, which functions to limit and appropriately scope the volume of content delivered to a given user. Moderation of content delivery may be implemented through the monitoring of content delivery conditions. For example, the number of pieces of content delivered in a shopping trip, the timing of previously delivered content, the location within the environment where content was delivered, the items related to the delivered content, the type of content delivered, and/or other factors may be factors in limiting, restricting or conversely permitting a content delivery condition.

In one preferred variation, content delivery conditions can be created and managed by distinct marketing entities. In one implementation, a marketer can create an account that is registered or associated with a number of products. The marketing account can preferably set content delivery conditions, manage content (e.g., set the media content of a coupon or advertisement), and/or make other suitable changes. In another variation, a store operator or other entity may manage all content delivery conditions for a store. Any suitable arrangement of management delegation can be used.

Monitoring of a content delivery condition can be based on analysis of a heuristic model based on one or more properties described above. Alternatively monitoring of a content delivery condition could be based on an optimization problem for one or more results. The tracked response(s) of a user to content delivery may be used as the optimized parameter. For example, the method may be configured to optimize acknowledgment of a delivered content. In another example, the method may be configured to optimize conversion of the delivered content where conversion may be defined as an item pickup after content delivery, item purchase after content delivery, or any suitable condition. A machine learning model or other algorithmic approaches may be used.

Additionally some variations of the method such as the variation shown in FIG. 10 may include selecting the content from a set of content that is associated with the item S250, which functions to determine the piece of content for delivery. Selection of content is preferably performed prior to delivering of the content. In some variations, content is paired with the relevant item. The item that is the subject of the customer-item interaction event is used in selecting the associated piece of content. In another variation, selecting content can include selecting the content from a set of content that is associated with the item. The set of content options is preferably previously configured for the item. In one implementation, a marketer may set multiple pieces of content for one item. Preferably, the content options are ranked by appropriateness to the current properties of the customer-item interaction event and/or other contextual properties.

In another variation, selecting the content is selected based on cart contents of the user. Items selected by the user for checkout/purchase can be used in ranking, scoring or otherwise evaluating the content options, and then picking the highest ranked content option. Alternatively, a content option may be selected randomly or selected using any suitable approach.

In one variation, selecting content may select content from a set of candidate options which functions to let other entities deliver content in response to interactions of a particular item. This may be more specifically used in offering a content delivery marketplace. Selecting the content from a set of content could include initiating a content delivery auction in response to a customer-item interaction event which includes selecting a set of auction bids, ranking the set of auction bids, and selecting content of the highest ranked bid for delivery. A content delivery marketplace is described in more detail below.

Block S260, which includes delivering content to an output interface, functions to update at least one device. The output interface is preferably a network connected device accessible from the management system of the method. Delivery of content is preferably initiated upon satisfying a content delivery condition or a specified customer-item interaction event. As described above, this may include communicating the content to the output interface directly upon satisfying the content delivery condition. Alternatively, delivering the content may include delivering the content in coordination with a subsequent event detected through processing of the image data. The subsequent event is preferably a customer-item interaction event such as one discussed above. For example, a content delivery condition may be initially satisfied when a user directs attention to an item for at least some minimum amount of time, delivering of content may be initiated when and if the user does not select the item for purchase and the customer-item proximity increases beyond a threshold (i.e., the user moves away from the item).

The content can be a digital coupon, advertisement, product information, and/or any suitable media item. The content can be text content, an image, a video, an audio message, an interactive media item, and/or any suitable type of content. The content is preferably delivered to one or more device destinations associated with the relevant user and/or item. Delivering content may additionally or alternatively include updating a content presentation device such as a graphical display, audio system, lighting system (LED lights), and/or the like.

Delivering content may additionally include selecting a content delivery medium, which can function to customize content delivery to the customer, the product, the scenario and/or other factors. In one variation, the delivery medium (e.g., email, push notifications, in-store display ads, etc.) can be customized based on customer preference and response rate.

In a preferred variation, the content is static content that a user may act on. In another variation the content could augment a digital interaction of the user depending on the user response to the content. In one preferred implementation, the digital content is a limited-offer coupon that is automatically applied to a checkout process depending on detected actions of the user. For example, the coupon may be for a set discount for an item or items, and is automatically applied if the user selects the item(s) for purchase during the current shopping trip. Processing of the image data and tracking content delivery response S270 can preferably be used in monitoring subsequent actions of the user.

The limited-offer coupon may additionally use capabilities of the CV monitoring system to set various conditions to enabling or disabling the limited-offer coupon. In one variation, a set of customer-item interaction events may be prescribed along with various other conditions to enable the coupon offer. For example, a limited-offer coupon may specify a user select at least two items for purchase within 30 seconds of acknowledgement of the coupon, where acknowledgment of the coupon is triggered through detecting viewing of the coupon. The timer could be triggered upon detecting the viewing. Viewing the coupon may be detected through an instance of the application presenting (e.g., displaying, playing, etc.) the content. Viewing the coupon may additionally or alternatively be detected through CV processing of the image data and detecting user attention directed at the output interface while presenting the content on the output interface.

In another variation, a set of customer interaction events and/or other conditions may disable or invalidate the limited-offer coupon. For example, a limited-offer coupon may be specified as being valid for the duration that the user stays in a set region. The set region may be a portion of the store (e.g., a specified aisle, a produce section, within 5 meters of the user's current position, within 5 meters of the item, etc.). In other words, the method can include monitoring for a set of customer-item interaction events, customer location, customer-item proximity, and/or other properties; and expiring the coupon upon satisfying some invalidating condition.

In one preferred variation, the digital content is delivered to a connected computing device of the user. More specifically, the content may be delivered to an instance of an application operable on the device of the user. A computing device could be a smart phone, smart watch, smart glasses, smart audio device, a computer, and/or any suitable type of device. The content may be delivered through an instance of an application such as a push notification or an in-app alert or notification. The content may alternatively be delivered through communication channel such as PSTN phone call, an SMS/MMS message, a social network platform message, an email, and/or any suitable type of communication.

The method may include detecting a device of the user, which can include synchronizing the CV monitoring system with at least one device of the user. Preferably, the CV monitoring system or other system elements are used in associating a CV detected person with a user record or account. The user record or account can similarly be associated with a device communication endpoint (e.g., a phone number, email address, username), and/or an application instance (e.g., an application on a smart phone that is signed into the user account of the user). Associating a CV detected and monitored user with an account and a user device can preferably be implemented in a manner substantially similar to the approach described in U.S. patent application Ser. No. 16/015,180, filed on 21 Jun. 2018, which is hereby incorporated in its entirety.

In another variation, the digital content is delivered to an environment system such as a display, an audio system, an interactive computing device, a lighting system, a smart cart with user interface outputs (e.g., a display on a shopping cart/basket), and/or any suitable system. This variation preferably augments systems within the environment in response to customer-item interactions in a similar manner as described above for a device of the user. An environment device will preferably be one of a set of possible environment devices distributed across the environment. An appropriate environment device is preferably selected based on user location, item location, item-association, and/or other suitable properties. For example, a display in proximity to a customer could be updated to display a personalized coupon for that customer in response to customer-item interaction. In another example, delivering content includes delivering content to an output interface selected from a set of environment devices. When applied to dynamic pricing, this may be further applied to updating a displayed price of a digitally controlled price display. The price display is preferably associated with an item (or alternatively an item/shelf location).

The method may additionally include tracking content delivery response S270, which functions to measure impact of content delivery. Tracking content delivery response preferably includes subsequent processing of the image data (e.g., using CV-based monitoring processing) and detecting subsequent customer-item interaction events. Tracking content delivery response may additionally or alternatively detect other attributes such as detecting user sentiment. Tracking content delivery response preferably applies subsequent processing of image data using one or more computer vision processes, but tracking content delivery response may alternatively detect the response through alternate channels. In one variation, the content delivery response may be detected through monitoring user interaction with delivered content on the user device (e.g., tracking actions of the user within an application that is presented the content).

This can include tracking rate of inspection of content. This can additionally or alternatively include tracking rate of associated customer consideration. The state of customer consideration can be detected when a customer (possibly after receiving the content) looks at the associated item, picks up the associated item, and places the associated item. Similarly, tracking content response can include tracking purchase rate of an associated item, which can track the rate at which the related item was purchased when content was delivered. Content delivery response data can be stored in association with content delivery records. In some cases, different content delivery responses can alter the processing of content delivery. For example, content delivered on behalf of a marketer may only be billed when different delivery responses are detected. In this way marketers could deliver under various pricing models like: cost-per-content-inspection, cost-per-product-inspection, cost-per-pick-up, cost-per-purchase, cost-per-cart, and the like.

Content delivery response data for a user may additionally be used in optimizing or updating the content delivery conditions for the user in the future. For example, detecting ignoring or disregarding of delivered content is repeatedly detected for one user, the method may subsequently augment the conditions or thresholds for which content delivery is initiated for less frequent delivery of content or prevention of content delivery—the user will thereby receive few content items that would be ignored. Alternatively, detecting acknowledgment and positive response to a delivered content by a user may indicate the user's positive opinion of the delivered content. The method may subsequently augment the conditions or thresholds for which content is initiated for more frequent delivery of content to that user. Such content delivery customization for users can be individually customized per user, and individually customized based on the content type and/or item type. For example, users may have different acceptance to coupons and ads.

As discussed above, some variations of the method may enable a bidding process wherein the method includes managing content delivery auction and thereby setting content delivery conditions and/or content delivery. Managing a content delivery auction can include selecting multiple content delivery requests for a particular customer content delivery condition and selecting at least one request to use in specifying content delivery. Generally, multiple content delivery requests will be selected for consideration based on general proximity to a particular product. In this way, marketers may be enabled to compete to deliver content based on around location, which is assessed by customer proximity to products. One or more of the content delivery requests are selected for delivery based on at least one factor such as price, content relevance, customer relevance, scenario relevance, pricing model (e.g., cost-per-purchase vs. cost-per-content-inspection), and the like.

Figure 5:
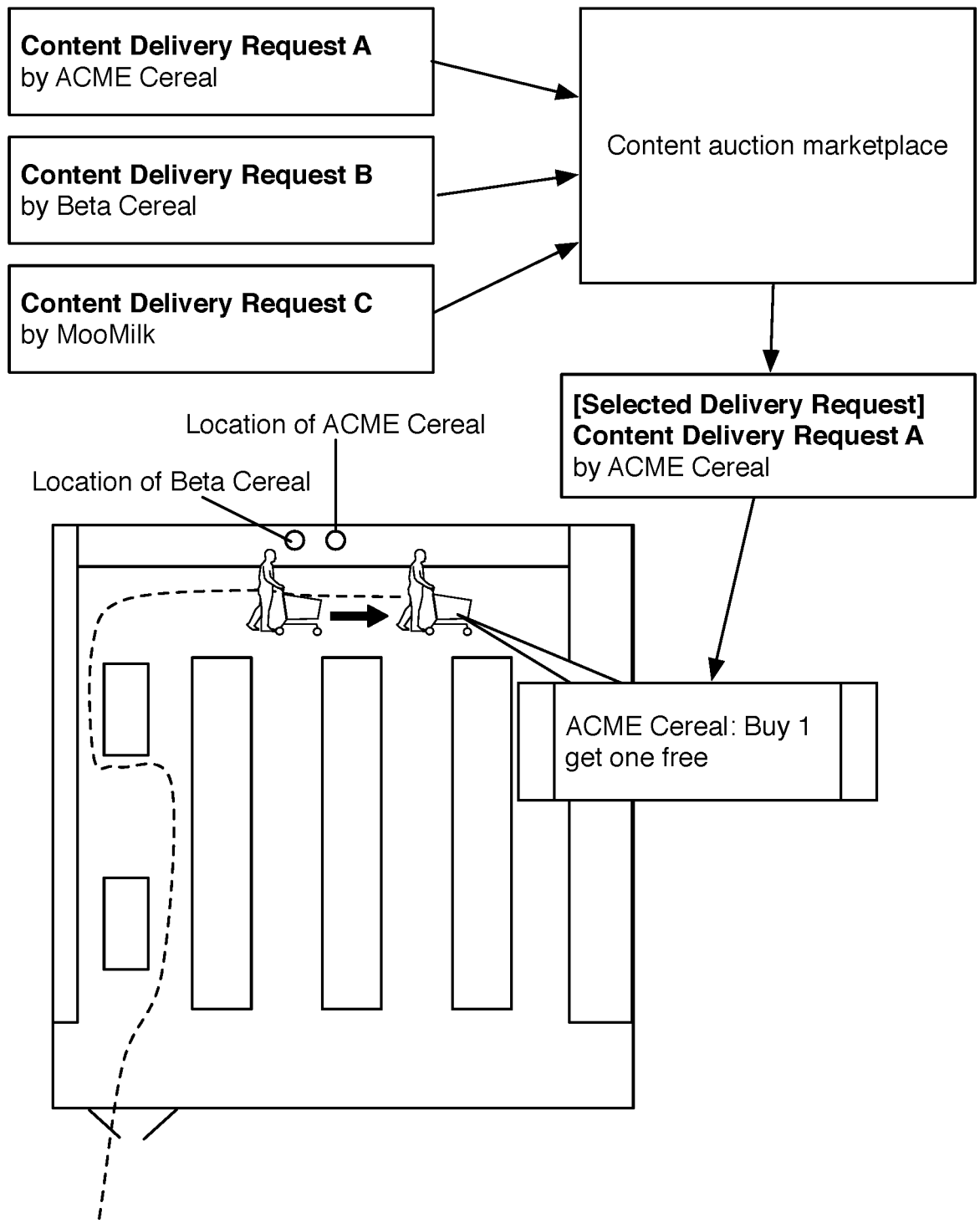
FIG. 5 is a schematic representation of an exemplary content delivery bidding auction.

As shown in FIG. 5, a customer may approach a region of a store where there are three product-entities interested in delivering content to a customer. One or more content delivery conditions can be satisfied resulting in selection of the content delivery requests by the three product-entities. The content delivery bid that wins the content delivery auction can then be delivered.

Product-entities can define different scenarios of interest for when and how content is delivered. In one variation, content delivery bids could be made by defining various customer properties and/or customer cart properties used for targeting customers. In this example, three competing hamburger bun companies may target customers with hamburger related items in their cart. Instead of delivering three hamburger bun related pieces of content, a bidding process can be initiated for multiple interested parties within a particular threshold and the hamburger bun piece of content is based on the winner of the bidding auction. Various rules can additionally be used to enforce content delivery restrictions for a customer so that a customer receives a suitable number of pieces of content, which may be based on customer's past response to content, the number of pieces of content delivered, the timing of content delivered, and the like.

In a preferred implementation of content delivery auction bidding process, the method can include: initiating a content delivery auction which includes selecting auction bids, ranking the auction bids, and selecting content of the highest ranked auction bid for delivery. In one preferred variation, an auction bidding process is initiated for a particular item. In this item-related auction bidding process, selecting of auction bids may include selecting auction bids associated with items in proximity to the item, which functions to consider other bids near an item. In one preferred implementation, selecting auction bids associated with items in proximity to the item can include determining item proximity through processing the image data. Computer vision can be used in determining stored item location for a set of items in the environment. Relative location can thus be determined for any item with a determined location. The item location may alternatively be specified through configuration defining expected location of items or through any suitable approach.

In auction bidding processes based in part on item proximity, content delivery bids for that item and nearby or related items may compete to deliver their content when some condition is met where content may be delivered as a customer interacts with a particular item. For example, when a user is observed considering a first brand of cereal, the three adjacent/nearby brands of cereal may submit content and set bid prices that could qualify it to deliver content in place of the other competing bids.

The ranking of the auction bids can be any suitable form of scoring, prioritization, and/or evaluation. Ranking may include evaluating content associated with the bid, evaluating a bid price (e.g., amount willing to be spent to deliver content), and/or the factors. The content may be evaluated based on quality of the content, relevance to the particular customer, relevance to the current conditions, relevance to the item associated with a triggering customer-item interaction event, and/or any suitable property of the content.

The auction bids are preferably requests for delivering different pieces of content. The auction bids may be for particular content delivery conditions such that multiple bids are competing for the same condition. As discussed above, one preferred variation has bids set for content delivery conditions of various items. The auction bids may alternatively be competing for other suitable conditions such as for particular shopper properties, shopping visit properties (e.g., basket contents), items, item classifications, and like. In one implementation, auction bids may specify a number of conditions or "tags" for which may qualify the bid to be considered for a given auction.

The content delivery auction may be initiated in response to a customer-item interaction event. For example, a content delivery auction may be initiated when a customer comes within In alternative implementations, an auction may be initiated prior to and independent to a customer product interaction event. A number of content delivery auctions may be initiated when a user is detected as starting a shopping visit in the environment. One or more auctions can be conducted to pre-determine the content delivery conditions through which a particular user may receive content (if the conditions are satisfied). For example, an auction process may initiate when a user enters a grocery store and the three highest ranking bids are set. The bids may be ranked according various factors such as those discussed above, but may additionally include properties such as proximity of the bids. For example two bids for content delivery for items in near proximity may be scored such that it is unlikely for both bids will be selected. In some variations, the bid selection process may include selection rules that mitigates or even prevents selection of bids based on the selection of another bid. In one implementation, the auction bids are ranked; the highest ranked bid is selected; and then the bids are reranked factoring in the selection of the first bid. This may increase the ranking of a bid that is different and/or not located near the item of the first bid, and may decrease the ranking of a bid that similar and/or located near the item of the first bid. The next highest ranked bid may then be selected from this reranked set of bids. This process may repeat until any suitable condition, such as meeting a maximum number of bids/conditions. Reranking of bids can additionally be performed after initiation of content delivery for one of the bids. Since a user may browse an environment in a variety of ways, the method may update planned content delivery conditions based on when and if various conditions are met or any suitable condition. For example, five potential content delivery conditions may be set, after the user has triggered three of the conditions, the other content delivery conditions may be removed so that the user receives no more than three pieces of content in one shopping trip. In one variation, the bids can be reranked periodically based on changing conditions such as basket contents, customer location, and the like.

Determining when and how different content delivery interactions can occur may similarly be performed independent of an auction bidding process.

An auction bidding process may be used in combination with tracking content delivery response. In one variation, the auction bidding process described above may be used in determining when and what content to be delivered. Tracking of content delivery response may be used in completing an auction bid. Different auction bids and/or content campaigns may specify different objectives or models for submitting bids such as setting cost-per-content-inspection, cost-per-product-inspection, cost-per-pick-up, cost-per-purchase, cost-per-cart, and the like. These may depend on detection of some subsequent response after delivering content. If the condition is met, then the method may include crediting a marketing account for completion of a bid. Other content delivery payment models may alternatively be used.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for dynamic digital communication in a physical environment comprising:
    collecting, from image capture devices, image data across the physical environment;
    identifying, based on the image data, a user within the physical environment;
    synchronizing the identified user in the image data to a detected application instance located within the physical environment, the application instance being operable on a computing device of the identified user;
    modeling, using processing of the image data, attention of the identified user and determining a retail item based on the attention of the identified user and based on relative position of the user to the retail item;
    detecting, based on processing of the image data, a customer-item interaction event between the identified user and the retail item;
    monitoring a proximity threshold based on proximity of the identified user to the retail item;
    in response to detecting the customer-item interaction event and while the identified user is within the proximity threshold, initiating a real-time content delivery auction, comprising selecting a set of auction bids based in part on the retail item and the identified user, ranking the set of auction bids, and selecting content of a digital message based on the ranking of the set of auction bids;
    while the identified user is within the proximity threshold, transmitting, via a network, the digital message to the application instance; and
    triggering, using the application instance, an alert through a user interface of the computing device of the application instance, the alert based on the digital message.

2. The method of claim 1, wherein detecting the customer-item interaction event further comprises detecting an occurrence or non-occurrence of the customer-item interaction event selected from a set of interactions invents events including detecting customer attention directed at an item, detecting an item pickup event, detecting item selection, or detecting an item put-back event.

3. The method of claim 1, further comprising:
    monitoring a content delivery condition that is based in part on the customer-item interaction event and the customer state of attention to the retail item; and
    wherein transmitting the digital message comprises delivering content to the computing device of the user and is initiated upon satisfying the content delivery condition.

4. The method of claim 3, wherein monitoring the content delivery condition comprises detecting occurrence of a first customer-item interaction event selected from user attention event, item pickup event, item selection event, or item put-back event.

5. The method of claim 4, wherein monitoring the content delivery condition further comprises detecting a sequence of item-level interaction events that includes a first item-level interaction event.

6. The method of claim 3, wherein monitoring the content delivery condition comprises detecting omission of a second customer-item interaction event performed by the user when within a defined proximity to the retail item.

7. The method of claim 3, wherein delivering the content to the computing device of the user comprises selecting, prior to delivering the content, the content from a set of content that is associated with the retail item.

8. The method of claim 7, wherein selecting the content is further selected based on cart contents of the customer.

9. The method of claim 1, wherein selecting the set of auction bids comprises selecting auction bids associated with nearby items in proximity to the retail item.

10. The method of claim 9, wherein selecting the auction bids associated with the nearby items in proximity to the retail item comprises determining, by processing the image data, the nearby items in proximity to the retail item.

11. The method of claim 1, further comprising tracking content delivery response to the digital message and crediting a marketing account of the selected content according to content delivery response.

12. The method of claim 1, further comprising, based on the image data, tracking location in the environment of a set of users, wherein the set of users includes at least the user.

13. The method of claim 1, further comprising tracking a content delivery response to the digital message.

14. The method of claim 1, further comprising detecting, by processing the image data after transmission of the digital message, a user response to the alert.

15. The method of claim 1, wherein triggering the alert comprises triggering vibrational feedback on the computing device.

16. A system for dynamic digital communication in a physical environment which comprises:
    a computer vision monitoring system that comprises a set of imaging devices installed in the environment, and that is configured to:
        collect, from the set of imaging devices, image data of the environment,
        track a set of users within the environment,
        identify, based on the image data, a user of the set of users within the physical environment,
        identify, based on the image data and the user in proximity, a retail item;
        synchronizing the identified user in the image data to a detected application instance located within the physical environment, the application instance being operable on a computing device of the identified user:

model, based on the image data, the identified user to determine an attribute of the user while in proximity to the retail item;

model, based on the image data, attention of the identified user and determine a retail item based on the attention of the identified user and based on relative position of the user to the retail item;

detect, based on the image data, a customer-item interaction event between the identified user and the retail item; and a content marketing system configured to:

monitor a proximity threshold based on proximity of the identified user to the retail item;

in response to detection of the customer-item interaction event and while the identified user is within the proximity threshold, initiate a real-time content delivery auction, which comprises configuration to select a set of auction bids based in part on the retail item and the identified user, rank the set of auction bids, and select content of a digital message based on the ranking of the set of auction bids;

while the identified user is within the proximity threshold, transmit, via a network, the digital message to the application instance; and trigger, using the application instance, an alert through a user interface of the computing device of the application instance, the alert based on the digital message.

17. The system of claim 16, wherein to transmit the digital message further comprises to deliver the content to an output interface of the instance of the application operable on the computing device.

18. The system of claim 16, further comprising a set of environment-installed computing devices; and wherein the content marketing system is configured to select at least one computing device of the set of environment-installed computing devices based on device proximity to the one user or an item of the customer-item interaction event and deliver the content to the one computing device.

19. The system of claim 16, wherein the content marketing system includes a digital content auction marketplace that is configured to collect the set of auction bids and initiate the content delivery auction used in real-time_selection of content for delivery to the output interface using data parameters set based on the customer-item interaction event, the identified user, and the retail item.

* * * * *